United States Patent [19]
Leggett et al.

[11] Patent Number: 6,145,807
[45] Date of Patent: Nov. 14, 2000

[54] BY-PASS STUD WITH INTEGRAL SAFETY VALVE

[75] Inventors: Henry H. Leggett, Hallsville; James Douty, Longview, both of Tex.

[73] Assignee: Hydrolex, Inc., Longview, Tex.

[21] Appl. No.: 09/307,298

[22] Filed: May 7, 1999

[51] Int. Cl.[7] ...................................................... F16K 1/04
[52] U.S. Cl. ........................................ 251/122; 137/454.5
[58] Field of Search ..................................... 251/122, 121, 251/DIG. 903; 137/454.5

[56] References Cited

U.S. PATENT DOCUMENTS

| | | | |
|---|---|---|---|
| 4,337,788 | 7/1982 | Seger | 251/122 |
| 4,601,310 | 7/1986 | Phillips | 251/903 |

*Primary Examiner*—Kevin Shaver
*Assistant Examiner*—J. P. Welsh
*Attorney, Agent, or Firm*—Finnegan, Henderson, Farabow, Garrett & Dunner, L.L.P.

[57] ABSTRACT

A valve controlled by-pass stud mechanism for a structure defining a stud receptacle and having a bleed passage intersecting the stud receptacle and normally containing a pressurized fluid medium. An elongate stud body is positioned in sealed relation within the stud receptacle and has a vent passage and defines an internal valve seat located about the vent passage and also defines a valve receptacle having internal threads. A needle valve is in threaded engagement with the internal threads of the valve receptacle and is movable by its threaded engagement within the valve receptacle between a closed position in sealing engagement with the valve seat and blocking flow of pressurized fluid from the bleed passage to the vent passage and an open position spaced from the valve seat and permitting flow of pressurized fluid from the bleed passage to the vent passage. The valve controlled by-pass stud mechanism is particularly usable in redundant fashion with manifold type bleed valves to provide for simple, safe and effective bleeding of pressurized fluid.

16 Claims, 1 Drawing Sheet

BY-PASS STUD WITH INTEGRAL SAFETY VALVE

BACKGROUND OF THE INVENTION

1. Field of the Invention

The present invention relates generally to valve systems for bleeding pressure from substantially closed chambers, such as the bonnet chambers of valves, conduit sections and the like. More particularly, the present invention concerns by-pass studs having a valve controlled pressure bleed passage and having the capability for being used in redundant fashion with other pressure bleed mechanisms such as manifold valves for safely and efficiently bleeding pressure from the bonnet chambers of valves, the conduit sections of wells and other pressure containing mechanisms.

2. Description of the Prior Art

In the case of valves and other pressure containing apparatus, especially pressure control apparatus for wells, it is often appropriate to bleed fluid pressure from closed chambers to enable other functions to take place. For example, it is often necessary to bleed fluid pressure from the bonnet chamber of a valve to enable the valve to be safely opened. As another example, when wire line controlled activities are necessary for wells, valves and conduit sections will typically be bled of pressure to enable installation of the wire line, wire line blowout preventers etc. The typical procedure for bleeding pressure from a closed chamber is to isolate a pressure containing chamber from a pressure source typically requires closure of an upstream valve. A pressure bleed conduit in communication with the closed pressure containing chamber by a conventional pressure by-pass stud to which the pressure bleed conduit is connected will then be controlled by one or more manifold valves which are opened to accomplish pressure bleeding.

While bleeding of fluid pressure from bonnet chambers and other pressure containing apparatus is efficiently controlled by conventional bleed valves, a number of problems exist that may influence the safety of the fluid handling system. One important consideration is that the pressure bleed system from the pressurized bonnet chamber or other pressure containing apparatus is always under pressure, with this pressure being controlled only by the manifold valve or other pressure bleed valve mechanism. In the event the bleed conduit of the pressure bleed system should be damaged and should begin to leak upstream of the manifold valves, there may be no way to safely stop the leakage without shutting down the pressure containing and controlling system. In the case of high pressure wells for controlling production of petroleum products, the well would need to be shut in by closing a master valve to allow the bleed control valve to be repaired or replaced, also, in the case of oil wells, release of potentially combustible petroleum products could result in various types of hazards, including fire, release of toxic gases, well blowout, contamination of the environment, etc. When the pressure bleed system has a single control valve such as a manifold valve, debris, such as sand, pipe scale and other particulate from the flowing fluid may interfere with complete closure of the valve. In this case the valve can have high pressure leakage of fluid across its seat, causing the seat or the valve element or both to be eroded and permanently damaged, so that its replacement or repair is necessary. Especially in the case of high pressure wells, it is desirable that the pressure bleed system have valve redundancy so that, in the event of leakage of the primary pressure bleed valve, a secondary bleed control valve may be closed to ensure against leakage in the pressure bleed system. This will permit the primary pressure bleed valve to be restored by repair, replacement or by simply cleaning away debris that interferes with its sealing capability. It is also considered desirable that the redundant secondary pressure bleed control valve be protected by structural components so that it cannot be easily damaged. The secondary bleed control valve should also be so located that leakage of a bleed conduit connected to a by-pass stud can be simply and efficiently stopped so that the integrity of the bleed conduit or its connection can be restored.

SUMMARY OF THE INVENTION

It is a principal feature of the present invention to provide a novel by-pass stud mechanism for pressure bleed connection with a closed pressure containing chamber, wherein the by-pass stud mechanism incorporates an integral valve mechanism permitting selective closure of the pressure bleed system upstream of the primary pressure bleed control valve or valves;

It is another feature of the present invention to provide a novel valve controlled by-pass stud mechanism which can be mounted within a simple through passage of a mechanical structure such as a bonnet flange of a valve mechanism or a connection flange of a conduit system so that the valve mechanism of the by-pass stud is protected by the mechanical structure against damage;

It is another feature of the present invention to provide a novel valve controlled by-pass stud mechanism which incorporates a manually operated mechanical needle valve as the valve component thereof to ensure simplicity and efficiency of bleed passage closure; and It is an even further feature of the present invention to provide a novel valve controlled by-pass stud mechanism which adds redundancy to a pressure bleed system so that, in the event of leakage of a primary bleed valve, a secondary valve may be closed to thereby close a pressure bleed system and isolate the primary pressure bleed valve from fluid pressure to enable its repair or replacement as desired.

Briefly, the various objects and features of the present invention are realized by providing a by-pass stud which is positioned in sealed relation within a through passage of a mechanical structure such as a bonnet flange of a valve mechanism or a connection flange of a conduit structure. The through passage will be intersected by a pressure bleed passage which is also in fluid communication with the pressure containing chamber being controllably bled. The through passage defines a by-pass stud receptacle which has an intermediate enlarged section or groove defining an annulus about the by-pass stud to permit exposure of an external intermediate section of the by-pass stud to the fluid pressure of the pressure bleed passage. The by-pass stud has an elongate stud body of greater length than the length of the stud receptacle and being exposed beyond the mechanical structure at each of its ends. The stud body defines an internal valve chamber and has intersecting cross passages which conduct fluid pressure from the annulus to an internal chamber of the stud body. The by-pass stud also defines an internal vent passage terminating at one axial end of the stud body and defines a tapered, generally conical concave valve seat at the intersection of the vent passage with the internal valve chamber. A needle valve is threaded into the stud body and is movable to an open position permitting flow of pressurized fluid from the valve controlled pressure bleed passage, across the tapered valve seat and into the pressure vent passage. The needle valve is also movable to a closed position where a tapered valve tip of the valve needle thereof is seated against the internal tapered seat and blocks flow of pressurized fluid from the pressure bleed passage to the vent passage. Being threaded within the by-pass stud body, the needle valve is moved between its open and closed positions by inserting a wrench, such as an Allen wrench, star wrench or the like into a wrench receptacle and rotating the threaded needle valve with the wrench to drive it toward or away from the tapered seat.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a sectional view of a valve controlled pressure by-pass stud constructed in accordance with the present invention and incorporating an integral needle valve mechanism being shown in its closed position; and FIG. 2 is a sectional view of the valve controlled pressure by-pass stud mechanism of FIG. 1, showing the integral needle valve mechanism thereof in its open position.

DETAILED DESCRIPTION OF PREFERRED EMBODIMENT

Figure 1:
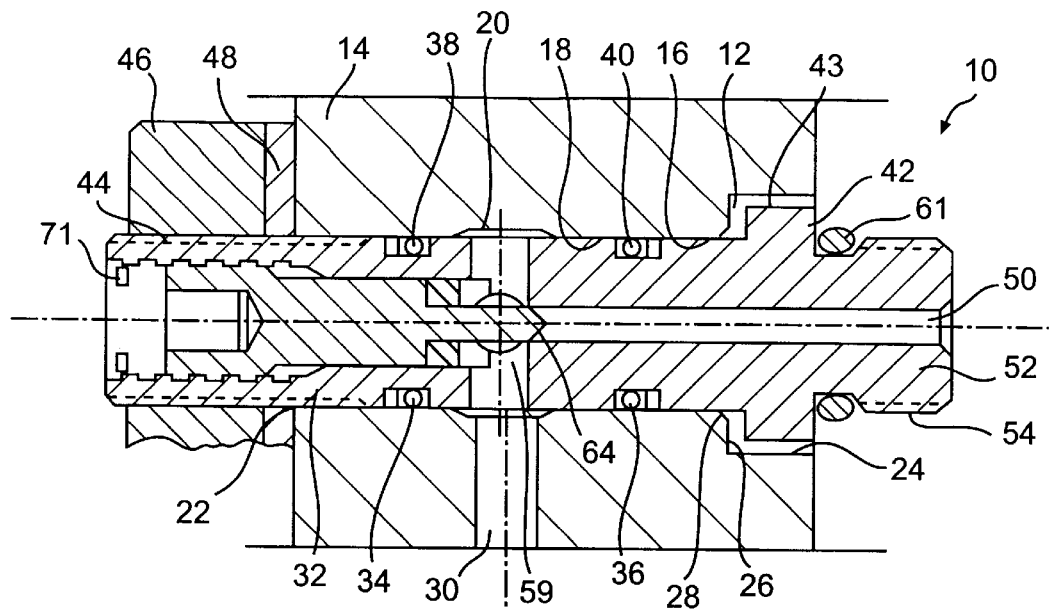
Figure 2:
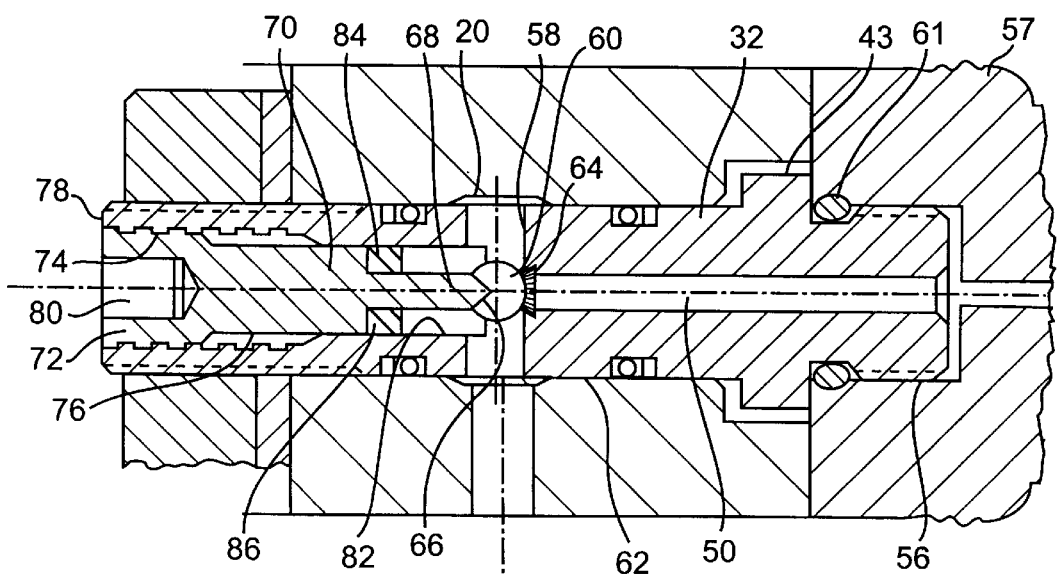

Referring now to the drawings and particularly to FIGS. 1 and 2 a pressure by-pass stud is shown generally at 10, having an integral needle valve and being constructed in accordance with the principals of the present invention. The by-pass stud 10 is shown in the Figures as being seated within a by-pass receptacle 12 that is defined in a mechanical structure 14 such as a bonnet flange, conduit flange, etc., that is typically disposed in assembly with a valve body to constitute a valve mechanism. The by-pass receptacle 12 is defined by a through passage 16 which extends through the mechanical structure 14 and defines an internal cylindrical surface 18 which may also be characterized as an internal sealing surface. The through passage 16 is also defined in part by a cylindrical internal enlargement 20 which is in the form of a shallow internal groove that is located intermediate the internal cylindrical surface 18. At one end the through passage forming the by-pass stud receptacle defines a circular opening 22 and at the opposite end defines an enlarged cylindrical section 24 having an internal circular shoulder 26 which has intersection with the internal cylindrical sealing surface 18 at a circular internal opening 28.

A pressure bleed passage 30 is in communication with a source of pressure, typically the pressure that is contained within the bonnet chamber of a valve, a flanged section of well conduit, etc. The pressure bleed passage 30 is also disposed in intersecting relation with the internal annular enlargement or groove 20 of the through passage. It should be borne in mind that the enlarged internal annular groove 20 functions as a pressure distributing annulus which conducts pressurized fluid from the pressure bleed passage 30 to a location surrounding an intermediate section of the by-pass stud mechanism 10.

The by-pass stud mechanism incorporates an elongate stud body 32 having circular seal grooves 34 and 36 located in spaced relation along the length thereof and containing respective sealing assemblies 38 and 40 for establishing seals between the elongate stud body 32 and the internal cylindrical sealing surface 18. The circular seal grooves 34 and 36 are sufficiently spaced that they are located on opposite sides of the circular internal enlargement or groove 20. This causes the seal assemblies 38 and 40 to confine pressure to the circular enlarged internal groove or annulus and a short intermediate section of the through passage 16.

The by-pass stud mechanism 10 also defines a circular locator flange 42 having wrench flats 43 which is adapted to seat against the circular internal shoulder 26 to establish a properly seated relation of the by-pass stud mechanism with respect to the metal structure 14 thorough which it extends. At its opposite end the elongate stud body 32 defines an externally threaded section 44 which may receive a lock nut 46 and washer 48 to thus positively lock the elongate stud body 32 with respect to the mechanical structure 14.

The elongate stud body 32 defines an internal vent passage 50 which terminates at a connection head 52 forming one axial end of the elongate stud body. Since the length of the elongate stud body 32 exceeds the width of the mechanical structure 14, both axial ends of the by-pass stud body are exposed as shown. The connection head 52 defines external threads 54 which provide for connection of the stud body 32 within an internally threaded receptacle 56 of a valve body 57. This threaded connection is sealed by an O-ring sealing member 61. If desired, the conduit 56 may be connected with a valve manifold, as is typically the case, to permit valve controlled bleeding of pressure via the bleed passage 30, annulus 20 and the vent passage 50 from a valve body 57 or other source of pressure.

As mentioned above, it is appropriate to provide the by-pass stud mechanism with a valving capability so that when valve manifolds are utilized in conjunction with the by-pass stud mechanism for purposes of bleeding pressure from valve bonnet chambers, pressurized conduit sections and the like, redundant valving will be provided in the pressure bleed system. According to the principals of the present invention the elongate stud body 32 defines an internal valve chamber 59 and also defines a pair of cross passages 58 and 60 which are disposed in intersecting relation with one another and with the valve chamber 59. The cross passages 58 and 60 define openings at the outer periphery 62 of the elongate stud body. The cross passages are also located so as to be positioned within the internal enlargement or groove 20 so that fluid pressure within the enlarged groove or annulus 20 will be conducted via the cross passages 58 and 60 to the valve chamber 59 of the elongate stud body. At the intersection of the cross passages 58 and 60 with the vent passage 50 the elongate stud body defines an internal tapered needle valve seat 64 which is disposed for sealing contact by a correspondingly tapered tip 66 of a valve needle element 68. The valve needle element 68 extends axially from a needle valve body 70 having an actuator end 72. The actuator end 72 of the needle valve is externally threaded and is received by an internally threaded section 74 of a needle valve receptacle 76 which is defined within an axial end 78 of the elongate stud body 32. For threaded actuation of the needle valve body 70, a wrench receptacle 80 is defined in one axial end of the needle valve body 70. The wrench receptacle 80 may be in the form of an Allen head receptacle, a star receptacle or may be of any suitable configuration for receiving a wrench of corresponding configuration. The wrench is rotated clockwise or counter-clockwise in order to drive the needle valve element 68 toward or away from its seating relation with the internal tapered needle valve seat 64 for closing or opening movement of the needle valve. To ensure that the valve element 70 remains within the internally threaded receptacle 74 a circular retainer clip 71 is located within an internal circular retainer groove within the stud body 32. In FIG. 1 the needle valve element 68 is shown in fully seated relation with the tapered conical concave needle valve seat 64 and thus "closed" while in FIG. 2 the needle valve element 68 is shown to be retracted from the internal tapered needle valve seat 64 and thus "open". Sealing between the needle valve body 70 and the internal cylindrical surface 82 of the needle valve receptacle is established by a circular sealing element 84 which is located around the valve needle element 68 and is supported by a circular shoulder 86 which is defined at the juncture of the needle valve element 68 with the needle valve body 70. The sealing element engages the cylindrical internal surface 82 of the needle valve receptacle and thus seals the needle valve with respect to the elongate stud body regardless of the position of the needle valve within the stud body.

In operation, the needle valve element 68 is normally open as shown in FIG. 2 with the needle valve 68 and its body structure 70 positioned with the tapered sealing tip 66 of the valve needle element 68 disposed in spaced relation with the internal tapered internal seat 64 of the elongate stud body 32. In this circumstance fluid pressure within the pressure bleed passage 30 will flow to the annulus defined by the internal groove 20, through the cross passages 58 and 60 and across the valve seat 64 to the vent passage 50.

Normally, venting of pressure from the valve controlled passage 30 will be achieved downstream of the by-pass stud mechanism by a manifold valve assembly or by any other suitable means and the needle valve mechanism within the pressure by-pass stud will be normally open. In the valve condition shown in FIG. 2 leakage of any fluid pressure along the needle valve body 70 will be prevented by the circular sealing element 84 which maintains an efficient seal with the internal cylindrical surface 82 of the needle valve receptacle whether the needle valve is open, as shown in FIG. 2, or closed, as shown in FIG. 1.

If for any reason the manifold valve assembly controlling venting of fluid pressure through the vent passage 50 should begin to leak, if the vent conduit 56 or its connections with the by-pass stud or the manifold valve should develop a leak, or if for any other reason closure of a redundant valve assembly is deemed appropriate, a wrench such as an Allen wrench may be inserted within the wrench receptacle of the needle valve body 70 and, typically, rotated clockwise to cause the external threads of the needle valve body to be threaded into the internal threads of the needle valve receptacle and thereby cause the needle valve to be moved to the right as shown in FIG. 2 from the to open position toward the closed position. When the tapered tip 66 of the valve needle element 68 has established sealing engagement with the internal valve seat 64 of the elongate stud body 32, the needle valve will be closed. In this condition the vent passage 50 and the vent conduit 56 will be isolated by the needle valve from the pressurized fluid contained within the pressure bleed passage 30 the annulus defined by the internal groove 20, the cross passages 58 and 60 and the valve chamber 59.

It is thereby seen that the by-pass stud mechanism of the present invention provides a valving capability which may be used to control venting of fluid or may be used in conjunction with other vent control devices such as manifold valves to provide a redundant valving system to thereby ensure efficient and safe pressure control. The needle valve mechanism of the pressure by-pass stud provides an efficient means for isolating fluid pressure from the vent conduit and manifold valve so that repair or replacement thereof may be accomplished without necessitating shut-down of the pressurized system.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A valve controlled fluid pressure by-pass stud mechanism for the pressure bleed system of a pressure containing chamber, comprising:

(a) a structural body defining a stud receptacle and having a bleed passage communicating said pressure containing chamber with said stud receptacle;

(b) an elongate stud body being disposed in sealed relation within said stud receptacle and defining a valve chamber in fluid communication with said stud receptacle, said elongate stud body also defining a vent passage intersecting said valve chamber and having a valve seat at the intersection of said vent passage with said valve chamber, said elongate stud body further defining a valve receptacle; and (c) a valve element being controllably movable within said valve receptacle and having a valve element disposed for seating engagement with said valve seat at a closed position of said valve element for blocking flow of pressurized fluid from said bleed passage to said vent passage and being positioned in spaced relation with said valve seat at an open position thereof for permitting flow of pressurized fluid from said bleed passage to said vent passage.

2. The valve controlled by-pass stud mechanism of claim 1, wherein:

(a) said structural element defining a through passage and having an internal annular groove intersected by said bleed passage and defining an annulus about said elongate stud body; and (b) spaced circular sealing means sealing said elongate stud body within said through passage on opposed sides of said internal annular groove.

3. The valve controlled by-pass stud mechanism of claim 1, wherein:

(a) said through passage having an enlargement and defining a circular shoulder; and (b) said elongate stud body having a circular locator flange projecting radially outwardly therefrom and having seating engagement with said circular shoulder.

4. The valve controlled by-pass stud mechanism of claim 3, wherein:

(a) said elongate stud body defining an externally threaded end; and (b) threaded locking means being received by said externally threaded end and securing said elongate stud body to said structural body.

5. The valve controlled by-pass stud mechanism of claim 1, wherein:
   (a) said elongate stud body defining internal threads within said valve receptacle;
   (b) said valve seat being of tapered configuration; and
   (c) said valve element being a needle valve having a valve body disposed in threaded engagement with said internal threads and being driven axially within said valve receptacle by said threaded engagement upon rotation thereof, said needle valve having a valve needle element projecting axially from said valve body and defining a tapered tip for seating engagement with said tapered valve seat at said closed position of said valve element.

6. The valve controlled by-pass stud mechanism of claim 5, wherein:
   (a) said valve receptacle being defined in part by an internal cylindrical sealing surface; and
   (b) a circular sealing element being located about said needle element and maintaining sealing of said needle valve element with said internal cylindrical sealing surface at all positions of said needle valve element within said valve receptacle.

7. The valve controlled by-pass stud mechanism of claim 1, wherein:
   (a) said elongate stud body having first and second axial ends each being exposed externally of said structural body, said first axial end being externally threaded;
   (b) threaded lock means being threadedly received by said externally threaded first axial end and securing said elongate stud body in fixed relation within said stud receptacle; and
   (c) said second axial end defining a conduit connection to which a pressure bleed conduit is connected, said vent passage opening at said conduit connection and conducting vented fluid pressure to said pressure bleed conduit.

8. The valve controlled by-pass stud mechanism of claim 1, wherein:
   (a) said valve receptacle having an internally threaded section;
   (b) said valve element being externally threaded and establishing threaded connection with said internally threaded section, upon rotation of said valve element within said valve receptacle said threaded connection imparting linear movement to said valve element for movement thereof toward said open or closed position; and
   (c) said valve element defining a wrench receptacle permitting wrench controlled rotation of said valve element for opening and closing movement of said valve element relative to said valve seat.

9. The valve controlled fluid pressure by-pass stud mechanism for the pressure bleed system of a pressure containing chamber, comprising:
   (a) a structural body defining a stud receptacle and having a bleed passage communicating said pressure containing chamber with said stud receptacle, said structural body defining an internal annular groove being intersected by said bleed passage;
   (b) an elongate stud body being located within said stud receptacle and defining a valve chamber in fluid communication with said stud receptacle, said elongate stud body also defining a vent passage intersecting said valve chamber and having a generally conical concave valve seat at the intersection of said vent passage with said valve chamber, said elongate stud body further defining a valve receptacle; and
   (c) a needle valve element being controllably movable within said valve receptacle and having a valve needle having a conical tip disposed for seating engagement with said valve seat at a closed position of said valve element for blocking flow of pressurized fluid from said bleed passage to said vent passage and being positioned in spaced relation with said valve seat at an open position thereof for permitting flow of pressurized fluid from said bleed passage to said vent passage.

10. The valve controlled by-pass stud mechanism of claim 9, wherein:
   a pair of spaced circular sealing elements establishing sealing of said elongate stud body within said through passage on opposed sides of said internal annular groove.

11. The valve controlled by-pass stud mechanism of claim 9, wherein:
   (a) said through passage having an enlargement at one axial end thereof and defining a circular shoulder;
   (b) said elongate stud body having a circular locator flange projecting radially outwardly therefrom and having seating engagement with said circular shoulder; and
   (c) means retaining said circular locator flange in seated engagement with said circular shoulder and retaining said elongate stud body in fixed relation within said stud receptacle.

12. The valve controlled by-pass stud mechanism of claim 11, wherein:
   (a) said elongate stud body defining an externally threaded end; and
   (b) threaded locking means being received by said externally threaded end and securing said elongate stud body in fixed relation within said stud receptacle and in fixed relation with said structural body.

13. The valve controlled by-pass stud mechanism of claim 9, wherein:
   (a) said elongate stud body defining internal threads within said valve receptacle;
   (b) said valve seat being of conical concave configuration; and
   (c) said needle valve element having a valve body defining external threads and being disposed in threaded engagement with said internal threads, said needle valve element being driven axially within said valve receptacle by said threaded engagement upon rotation thereof, said needle valve element having a valve needle projecting axially from said valve body and defining a conical tip for seating engagement with said conical concave valve seat at said closed position of said needle valve element.

14. The valve controlled by-pass stud mechanism of claim 9, wherein:
   (a) said valve receptacle being defined in part by an internal cylindrical sealing surface; and
   (b) a circular sealing element being located around said valve needle element and maintaining sealing of said needle valve element with said internal cylindrical sealing surface at all positions of said needle valve element within said valve receptacle.

15. The valve controlled by-pass stud mechanism of claim 9, wherein:
(a) said elongate stud body having first and second axial ends each being exposed externally of said structural body, said first axial end being externally threaded;
(b) threaded lock means being received by said externally threaded first axial end and securing said elongate stud body in fixed relation within said stud receptacle;
(c) said second axial end defining a conduit connection, said vent passage opening at said conduit connection; and
(d) a pressure bleed conduit being connected to said conduit connection and conducting vented fluid pressure from said vent passage.

16. The valve controlled by-pass stud mechanism of claim 9, wherein:
(a) said valve receptacle having an internally threaded section;
(b) said valve element being externally threaded and establishing threaded connection with said internally threaded section, upon rotation of said valve element within said valve receptacle said threaded connection imparting linear movement to said valve element for movement thereof toward said open or closed position; and
(c) said valve element defining a wrench receptacle permitting wrench controlled rotation of said valve element for opening and closing movement of said valve element relative to said valve seat.

* * * * *